(12) United States Patent
Demirer et al.

(10) Patent No.: US 10,883,341 B2
(45) Date of Patent: Jan. 5, 2021

(54) DETERMINING CONTROL INPUTS FOR DRILLING A WELLBORE TRAJECTORY IN A GEOLOGIC FORMATION

(71) Applicant: Halliburton Energy Services, Inc., Houston, TX (US)

(72) Inventors: Nazli Demirer, Houston, TX (US); Umut Zalluhoglu, Humble, TX (US); Julien Christian Valery Marek, Houston, TX (US); Robert Darbe, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/537,092

(22) Filed: Aug. 9, 2019

(65) Prior Publication Data

US 2020/0095849 A1 Mar. 26, 2020

Related U.S. Application Data (60) Provisional application No. 62/734,887, filed on Sep. 21, 2018.

(51) Int. Cl.
*G05B 19/402* (2006.01)
*E21B 41/00* (2006.01)
(Continued)

(52) U.S. Cl.
CPC ........ *E21B 41/0092* (2013.01); *G05B 19/402* (2013.01); *E21B 7/04* (2013.01);
(Continued)

(58) Field of Classification Search
CPC .... E21B 41/0092; E21B 44/00; E21B 49/003; E21B 7/04; G05B 19/402; G05B 2219/45129
See application file for complete search history.

(56) References Cited

U.S. PATENT DOCUMENTS

| 9,297,205 B2 | 3/2016 | Benson et al. |
| 9,404,354 B2 | 8/2016 | Sugiura |

(Continued)

FOREIGN PATENT DOCUMENTS

| GB | 2332465 A | 6/1999 |
| WO | 2017116436 A1 | 7/2017 |
| WO | 2018106254 A1 | 6/2018 |

OTHER PUBLICATIONS

Feng et al., The Control Technology of Wellbore Trajectory ControlToolBased on Radio Frequency Identification Device (RFID), Aug. 2016, International Conference on Mechatronics and Automation, p. 2060-2064. (Year: 2016).*

(Continued)

*Primary Examiner* — Kidest Bahta
(74) *Attorney, Agent, or Firm* — Gilliam IP PLLC (57) ABSTRACT

One or more wellbore trajectories and respective control inputs are determined which meet a wellbore trajectory model, a constraint, and a wellbore length. A wellbore trajectory and respective control input from the one or more wellbore trajectories and respective control inputs are then identified which minimize a cost function associated with the performance objective. The control input associated with this wellbore trajectory are output to a drilling system for drilling a wellbore.

20 Claims, 6 Drawing Sheets

(51) Int. Cl.
 *E21B 7/04* (2006.01)
 *E21B 44/00* (2006.01)
 *E21B 49/00* (2006.01)

(52) U.S. Cl.
 CPC .............. *E21B 44/00* (2013.01); *E21B 49/003* (2013.01); *G05B 2219/45129* (2013.01)

(56) References Cited

U.S. PATENT DOCUMENTS

| | | | |
|---|---|---|---|
| 9,404,355 | B2 | 8/2016 | Bayliss et al. |
| 9,784,089 | B2 | 10/2017 | Boone et al. |
| 9,945,222 | B2 | 4/2018 | Sugiura et al. |
| 2008/0275648 | A1* | 11/2008 | Illfelder ................ E21B 47/022 702/7 |
| 2010/0185395 | A1* | 7/2010 | Pirovolou ................ E21B 7/04 702/9 |
| 2011/0172976 | A1 | 7/2011 | Budiman et al. |
| 2014/0379133 | A1 | 12/2014 | Tom |
| 2015/0218914 | A1 | 8/2015 | Panchal et al. |
| 2015/0247397 | A1 | 9/2015 | Samual |
| 2015/0317585 | A1 | 11/2015 | Panchal et al. |
| 2015/0330209 | A1 | 11/2015 | Panchal et al. |
| 2016/0265334 | A1 | 9/2016 | Dykstra et al. |
| 2016/0281489 | A1 | 9/2016 | Dykstra et al. |
| 2017/0211372 | A1 | 7/2017 | Samuel |
| 2017/0306702 | A1* | 10/2017 | Summers ................ E21B 44/02 |
| 2017/0335671 | A1 | 11/2017 | Dykstra |

OTHER PUBLICATIONS

GB Application No. 1911766.2, Combined Search and Examination Report, dated Feb. 10, 2020, 8 pages.
PCT Application Serial No. PCT/US2019/045989, International Search Report, dated Nov. 28, 2019, 3 pages.
PCT Application Serial No. PCT/US2019/045989, International Written Opinion, dated Nov. 28, 2019, 5 pages.

* cited by examiner

DETERMINING CONTROL INPUTS FOR DRILLING A WELLBORE TRAJECTORY IN A GEOLOGIC FORMATION

RELATED DISCLOSURE

This disclosure claims the benefit of priority under 35 U.S.C. § 119(e) of U.S. Provisional Application No. 62/734,887 filed Sep. 21, 2018 entitled "Tool-Specific Steering Optimization to Hit a Target", the contents of which are herein incorporated by reference in its entirety.

FIELD OF USE

This disclosure generally relates to directional drilling in a geologic formation, and more particularly to determining control inputs for drilling a wellbore trajectory in the geological formation.

BACKGROUND

Drilling for hydrocarbons typically involves drilling a wellbore trajectory to a target in a geologic formation such as an oil or gas reservoir. Ability of the drilling system to drill the wellbore trajectory to the target depends on various control inputs provided to the drilling system which are used to steer a drill bit of the drilling system to the target. Errors in the control inputs provided to the drilling system result in the drill bit drilling a wellbore trajectory that misses the target.

BRIEF DESCRIPTION OF THE DRAWINGS

Aspects of the disclosure may be better understood by referencing the accompanying drawings.

The drawings are for purpose of illustrating example embodiments, but it is understood that the inventions are not limited to the arrangements and instrumentalities shown in the drawings.

DESCRIPTION

The description that follows includes example systems, methods, techniques, and program flows that embody aspects/embodiments of the disclosure. However, it is understood that this disclosure may be practiced without these specific details. For instance, this disclosure refers to determining control inputs for drilling a wellbore trajectory in a geologic formation. Aspects of this disclosure can be applied to drilling in other contexts as well. In other instances, well-known instruction instances, protocols, structures and techniques have not been shown in detail in order not to obfuscate the description.

Overview

Embodiments described herein are directed to determining control inputs to drill a wellbore trajectory in a geologic formation. A steering decision system determines the control inputs based on various steering decision inputs. The steering decision inputs include a wellbore trajectory model, an initial wellbore trajectory length, and constraints associated with drilling the wellbore trajectory.

The wellbore trajectory model predicts a wellbore trajectory drilled in the geologic formation and be defined by modeling inputs. The modeling inputs can take many forms. In some example, the modeling inputs are a bottom hole assembly (BHA) configuration of a drilling system which in some examples includes a bit type for the drilling. Additionally, or alternatively, the modeling inputs are a survey of the geologic formation which in some examples indicates properties of rock formations. Still additionally, or alternatively, the modeling inputs include real-time drilling data that may change over time such as a weight on bit (WOB). The initial wellbore length indicates a minimum length of the wellbore trajectory. The constraints define limits to drilling operations such as operational constraints and trajectory constraints. Operational constraints define bounds associated with one or more control inputs for steering the drilling tool to drill the wellbore trajectory. The bounds identify maximum or minimum control inputs which are provided to the drilling system. The trajectory constraints define limits on a position of the wellbore trajectory in the geologic formation (to prevent collisions such as with another wellbore in the geologic formation). Additionally, or alternatively, the trajectory constraints define limits on an attitude and/or curvature of the wellbore trajectory to control wellbore tortuosity.

The steering decision inputs also includes a performance objective for drilling a wellbore trajectory in the geologic formation. The wellbore trajectory needs to meet the performance objective. For example, the performance objective is to minimize curvature changes of the wellbore trajectory indicated by tortuosity. As another example, the performance objective is to minimize borehole length of the wellbore trajectory. In yet another example, the performance objective is to limit changes in downlink commands to change control input associated with the drilling the wellbore trajectory. As another example, the performance objective is to minimize a vertical position offset between the wellbore trajectory and a target in the geologic formation. In some examples, the performance objective is represented as a cost function which is minimized. The performance objective may take other forms as well, including combinations of performance objectives, or be part of the constraints.

A determination is made whether one or more wellbore trajectories and respective control inputs meets the wellbore trajectory model, the constraint, and the initial wellbore length. If one or more first wellbore trajectories and respective control inputs meets the wellbore trajectory model, the constraint, and the initial wellbore length, then a determination is made as to which wellbore trajectory and respective control inputs of the one or more wellbore trajectories and respective control inputs minimizes a cost function associated with the performance objective. For example, the cost function identifies which wellbore trajectory and respective control inputs of the one or more wellbore trajectories is closest to a target in the geologic formation.

The control inputs associated with the wellbore trajectory that minimizes the cost function is output.

If the one or more wellbore trajectories and respective control inputs does not meet the wellbore trajectory model, the constraint, and the initial wellbore length, then the wellbore length is adjusted. For example, the wellbore length may be increased by a predetermined amount from the initial wellbore length. A determination is made whether one or more wellbore trajectories and respective control inputs meets the wellbore trajectory model, the constraints, and the adjusted wellbore length. If the one or more wellbore trajectories and respective control inputs meets the wellbore trajectory model, the constraint, and the adjusted wellbore length, then a determination is made as to which wellbore trajectory and respective control inputs of the one or more wellbore trajectories and respective control inputs meeting the wellbore trajectory model, the constraint, and the adjusted wellbore length further minimizes a cost function associated with the performance objective. The control inputs associated with this wellbore trajectory that minimizes the cost function is output.

If the one or more wellbore trajectories and respective control inputs does not meet the wellbore trajectory model, the constraint, and the adjusted wellbore length, then the constraints are adjusted. For example, a wellbore curvature limit or generally a constraint may be increased when the adjusted wellbore length is at an upper defined bound. A determination is made whether one or more wellbore trajectories and respective control inputs meets the wellbore trajectory model, the adjusted constraints, and the adjusted wellbore length. If the one or more wellbore trajectories and respective control inputs meets the wellbore trajectory model, the adjusted constraint, and the adjusted wellbore length, then a determination is made as to which wellbore trajectory and respective control inputs of the one or more wellbore trajectories and respective control inputs meeting the wellbore trajectory model, the adjusted constraint, and the adjusted wellbore length further minimizes a cost function associated with the performance objective. The control inputs associated with this wellbore trajectory that minimizes the cost function is output.

In this regard, the determined wellbore trajectory and respective control inputs meets one of (1) the initial wellbore length, the constraints, and the wellbore trajectory model, (2) the adjusted wellbore length, the constraints, and the wellbore trajectory model, or (3) the adjusted wellbore length, the adjusted constraints, and the wellbore trajectory model. Determining the control inputs associated with the wellbore trajectory in this manner improves drilling accuracy to a target and production of hydrocarbon. The disclosed steering decision system also produces smooth steering decisions which reduces wellbore tortuosity and enables drilling longer laterals. Early warnings are also provided on whether a target can be reached, streamlining interactions between drilling teams and geology teams.

The description that follows includes example systems, apparatuses, and methods that embody aspects of the disclosure. However, it is understood that this disclosure may be practiced without these specific details. In other instances, well-known instruction instances, structures and techniques have not been shown in detail in order not to obfuscate the description.

Example Illustrations

Figure 1:
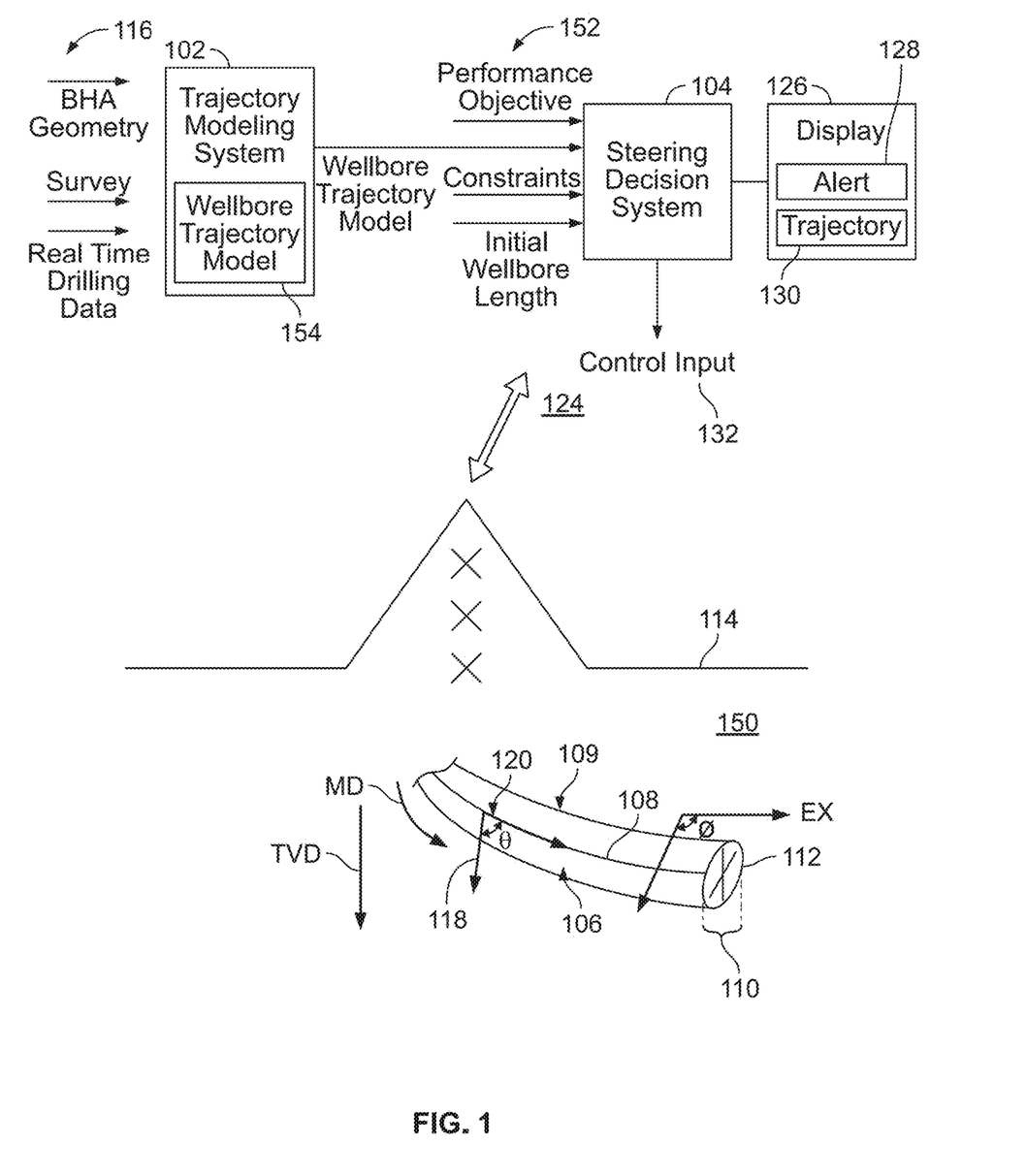
FIG. 1 is an example system for determining control inputs for drilling a wellbore trajectory in a geologic formation.

FIG. 1 is an example system 100 for determining control inputs provided to a drilling system to steer a drill bit of the drilling system to drill a wellbore trajectory in a geologic formation. The system 100 may include a drilling system 106, a trajectory modeling system 102, and a steering decision system 104.

The drilling system 106 may include a drill string 108 and a bottom hole assembly (BHA) 110. The drill string 108 is a column or string of drill pipe spanning from the surface 114 downhole. The BHA 110 is a component of a lower part of the drill string 108 which includes drill collars, stabilizers, measuring while drilling (MWD) components, logging while drilling (LWD) components, among other components. The BHA 110 includes a drilling tool such as a mud motor and/or a rotary steerable system (RSS) to facilitate rotating a drill bit 112 to drill a wellbore trajectory forming wellbore 109. With RSS, the drill string 108 is rotated from the surface 114 of the geologic formation 150 which causes the drill bit 112 to rotate to drill the wellbore trajectory. The mud motor is located downhole as a component of the drill string 108. The mud motor rotates the drill bit 112 to drill the wellbore trajectory and the drill string 108 is either held rotationally stationary (slide mode) or not (rotation mode). The mud motor uses drilling fluid (commonly referred to as drilling mud, or generally mud) to create an eccentric motion in a power section of the mud motor which is transferred as concentric power to the drill bit 112.

The trajectory modeling system 102 defines a wellbore trajectory model 154 which predicts the wellbore trajectory of the wellbore 109 which would be drilled based on control inputs provided to the drilling system 106. The wellbore trajectory model 154 may be defined by modeling inputs 116 input into the trajectory modeling system 102. The modeling inputs 116 may be a bottom hole assembly (BHA) configuration such as a geometry and/or type of the drill collars, stabilizers, drill bit, MWD components, LWD components, and/or drilling tool of the BHA 110, The BHA configuration may indicate a response of the BHA 110 resulting from downhole forces. Additionally, or alternatively, the modeling inputs 116 may be a survey of the geologic formation. The survey indicates the wellbore trajectory as the drill bit 112 drills through the geologic formation 150. The survey may also define properties of the wellbore trajectory such as locations and types of geologic structures in the geologic formation 150, such as formation layers, rock type, and reservoirs in the geologic formation 150. The survey may be determined by the LWD and/or MWD components of the drill string 108 performing measurements while the drill string 108 is moving (continuous measurements) or stationary (stationary measurements).

The modeling inputs 116 may also include real-time drilling data. The real-time drilling data may be parameters associated with drilling that may change over time such as a weight on bit (WOB) which is a downward force applied to the drill bit 112 as it drills the wellbore 109 in the geologic formation 150. The real-time drilling data may also include the history of toolface (TF) and steering ratio (SR) up to a current hit depth. The toolface indicates an angle to steer the drill bit 112. The steering ratio is typically a value between zero and one indicative of lateral forces applied to the drill bit 112 to affect how quickly or slowly a drilling direction is changed as a function of distance. For example, between a steering ratio of 1 and 0.5, the steering ratio of 1 may indicate that the drilling direction will turn more over a distance compared to the steering ratio of 0.5 over that same distance. The SR and TR may be based on control inputs associated with an attitude of the wellbore trajectory to be drilled. The attitude may be defined by an inclination and/or elevation. The inclination may be an angle θ between a direction of gravity 118 such as a vertical line and a tangent 120 to the wellbore trajectory to be drilled. The azimuth φ may be a direction of the wellbore trajectory to be drilled. For example, the azimuth φ is defined as the direction of the wellbore trajectory being drilled on a horizontal plane 122 measured clockwise from a reference, such as the north reference (ex). The control inputs may be based on this attitude, defined as uφ (in inclination plane), u (in azimuth plane), and uψ (in pseudo-azimuth plane described below). The SR and TF may translate to a force applied to the drill bit 112 based on change in rotary speed of the drill string 108, flow of drilling fluid (i.e., mud), and/or the WOB to steer the drill bit 112 in the direction indicated by the azimuth and inclination.

The trajectory modeling system 102 may use the modeling inputs 116 to determine a wellbore trajectory model 154 for predicting a trajectory of the wellbore 109. The wellbore trajectory model 154 may take many forms. In one example, the wellbore trajectory model 154 may be a mathematical model which predicts a wellbore trajectory drilled in the geologic formation 150 in terms of absolute directional measurements. In another example, the wellbore trajectory model 154 may be a probabilistic model which predicts a wellbore trajectory drilled in the geologic formation 150 in terms of probable directional measurements. Outputs of the probabilistic model would be a mean outcome of the directional measurements along the wellbore and a standard deviation (or variance). In addition to the modeling inputs 116 described above, the probabilistic model can be based on previously drilled wells in a same area/basin, across different areas/basins, or for a given set of tools, bit, etc. Properties associated with the previously drilled wells may be used to calibrate a mean and variance output by the probabilistic model. The wellbore trajectory model 154 may take other forms including neural networks and fuzzy systems. One or more of the survey, the WOB, and real-time data may be used to update the wellbore trajectory model to reflect real time operation of the drilling system 106.

The steering decision system 104 determines control input 132 provided to the drilling system 106 for steering the drill bit 112 of the drilling system 106 to drill the wellbore trajectory. The wellbore trajectory and control input 132 are based on steeling decision inputs 152 provided to the steering decision system 104. The steering decision inputs 152 may include one or more of the wellbore trajectory model 154 determined by the trajectory modeling system 102, an initial wellbore length of the wellbore 109, constraints, and a performance objective.

The wellbore trajectory model 154 is described above. The initial wellbore length indicates a minimum length of the wellbore trajectory. The initial wellbore length is characterized as a measured depth (MD) indicative of distance along the wellbore 109. The initial wellbore length might be no less than the total vertical depth (TVD) from a starting point to a target in the geologic formation 150 to drill, but could be greater depending on a path taken between the starting point and target. The initial wellbore length may be determined based on the surveys, continuous measurements of the geologic formation made by the LWD and MWD tools, and/or defined by an external input such as from a drilling operator.

The constraints may define limits to drilling operations and take the form of operational constraints and trajectory constraints. Operational constraints may define bounds associated with one or more control inputs for steering the drilling tool to drill the wellbore trajectory. The bounds may identify maximum or minimum control inputs which can be provided to the drilling system. The operational constraints may define bounds (e.g., minimum and/or maximum values) for the real-time drilling data such as WOB and/or rate of penetration (ROP) of the drill hit 112. The trajectory constraints may define limits on a position of the wellbore trajectory in the geologic formation 150 (to prevent collisions such as with another wellbore in the geologic formation). Additionally, or alternatively, the trajectory constraints may define limits on an attitude and/or curvature of the wellbore trajectory to control wellbore tortuosity. In some examples, the position may be indicated by cartesian coordinates and/or a true vertical depth while the attitude may be indicated by an inclination and azimuth. The position and/or attitude may be specified in absolute terms or relative to another position, curvature, and/or attitude of the wellbore trajectory. Additionally, or alternatively, the trajectory constraints can be identified as a surface or volume in the geologic formation which the wellbore trajectory is to cross or not to cross. In some examples, the trajectory constraints may define multiple points, surfaces, or volumes in the geologic formation which the wellbore trajectory is to cross or not to cross.

The performance objective may define a characteristic of a wellbore trajectory. The performance objective may take many forms. For example, the performance objective may be to minimize curvature changes of the wellbore trajectory indicated by tortuosity. As another example, the performance objective may be to minimize borehole length of the wellbore trajectory. As yet another example, the performance objective may be to limit and/or minimize changes in downlink commands to change control input associated with the drilling the wellbore trajectory, minimizing time spent drilling the wellbore trajectory. As another example, the performance objective may be to minimize an offset between the wellbore trajectory and a target in the geologic formation. In some examples, the performance objective may be represented as a cost function. The performance objective may take other forms as well, including combinations of performance objectives, or be part of the constraints. The performance objective is input into the steering decision system 104.

The steering decision system 104 may determine a wellbore trajectory and respective control inputs for drilling the wellbore trajectory that meets the initial wellbore length, performance objective, constraints, and wellbore trajectory model. If a wellbore trajectory and respective control inputs meet the initial wellbore length, performance objective, constraints, and wellbore trajectory model, then the steering decision system 104 outputs control input 132 which are provided to the drilling system 106 via a wired or wireless communication path 124 to the drilling system 106 to steer the drill bit 112 to drill the wellbore trajectory. The drilling system 106 uses the control inputs 132 to drill the wellbore trajectory.

If a wellbore trajectory and respective control inputs does not meet the initial wellbore length, performance objective, constraints, and wellbore trajectory model, then the steering decision system 104 may adjust the initial wellbore length by a predetermined amount which may be an input to the steering decision system 104. The steering decision system 104 may then determine whether a wellbore trajectory and respective control inputs meets the adjusted initial wellbore length, the constraints, the wellbore trajectory model, and the performance objective. If a wellbore trajectory and respective control inputs meets the adjusted initial wellbore length, the constraints, the wellbore trajectory model, and the performance objective, then the steering decision system 104 outputs control input 132. The steering decision system 104 may be coupled to the drilling system 106 via a wired or wireless communication path. The control input 132 may be used to determine a steering ratio (SR) and/or tool face (TF) which are provided to the drilling system 106 via the wired or wireless communication path 124 to steer the drill bit 112 to drill the wellbore trajectory.

If a wellbore trajectory does not meet the adjusted initial wellbore length, the constraints, the wellbore trajectory model, and the performance objective, then the steering decision system 104 may relax the constraints and determine whether a wellbore trajectory and respective control inputs meets the adjusted initial wellbore length, the relaxed constraints, the wellbore trajectory model, and the performance objective. The constraints may continue to be relaxed until a wellbore trajectory and respective control inputs is determined that meet the adjusted initial wellbore length, the relaxed constraints, the wellbore trajectory model, and the performance objective.

In some examples, the steering decision system 104 may have a display 126. The display 126 may output an alert 128, for example, to indicate that the wellbore trajectory cannot be drilled based on the constraints, wellbore length, wellbore trajectory model, and performance objective. The display 126 may also show the wellbore trajectory that would be drilled based on the control inputs 132.

Figure 2:
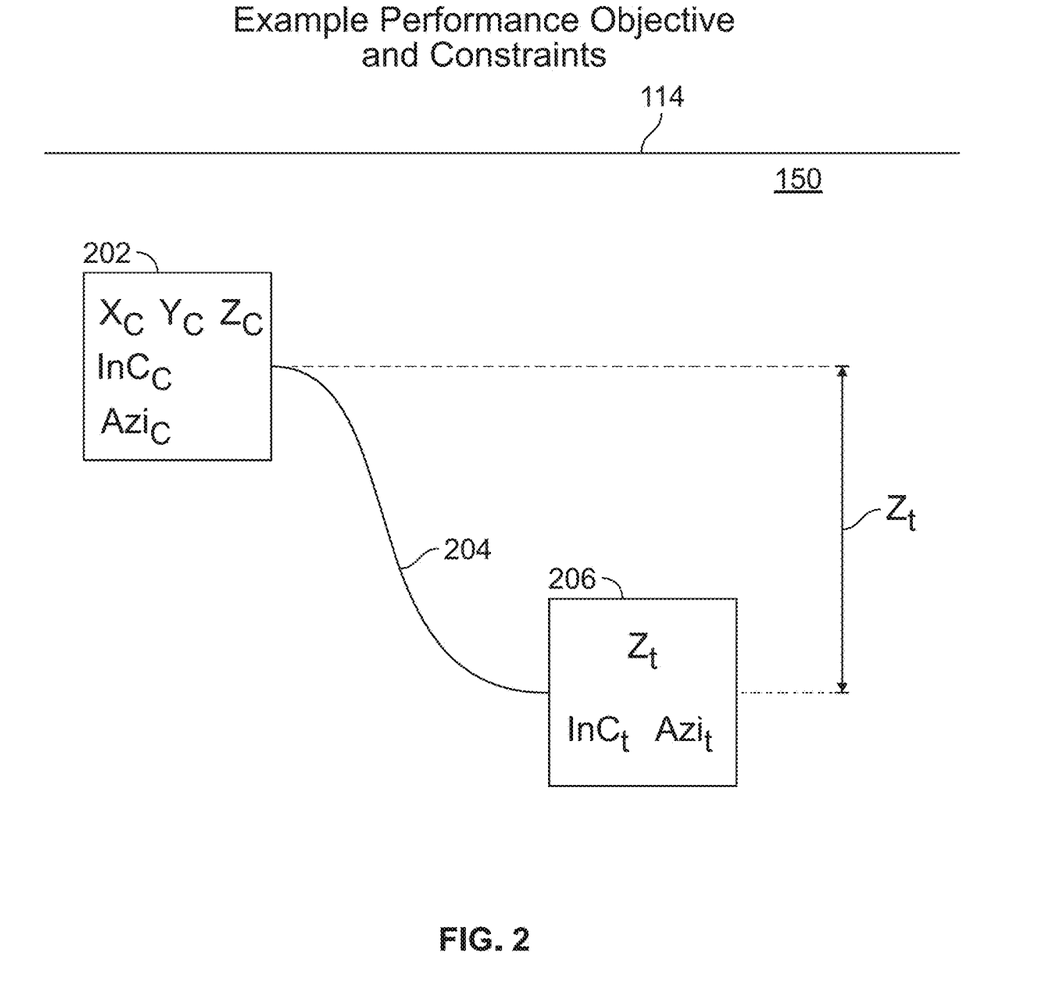
FIG. 2 graphically illustrates an example performance objective associated with drilling the wellbore trajectory in the geologic formation.

FIG. 2 graphically illustrates an example performance objective and constraint input into the steering decision system. The performance objective may be to drill a wellbore from a starting point 202 to as close to a target 206 as possible in the geologic formation 150. The closeness may be defined by a true vertical depth (TVD) in the geologic formation 150. The constraint may be that the attitude of the wellbore at the target 206 has to match a target attitude. The starting point 202 may be identified by a current position and attitude (inclination and azimuth) of the drill bit. The current position may be a one, two, or three-dimensional spatial position of the wellbore or depth. For example, the starting point 202 may be in Cartesian coordinates [Xc,Yc,Zc] where c represents the current position Xc is typically the position in North-South (NS) direction, Yc is typically the position in East-West (EW) direction and Zc is a depth or true vertical depth (TVD). The attitude of the wellbore may be represented as an inclination and azimuth of the wellbore [Inc_c, Azi_c]. The target 206 is specified in relative terms or absolute terms. Relative terms may be a position and/or attitude relative to the starting point 202. Absolute terms may be a position and/or attitude of the wellbore at the target 206. The position may be represented as [Xt,Yt,Zt] where t represents the target, Xt is the target position in NS direction, Yt is the target position in EW direction and Zt is a depth or TVD. The attitude of the wellbore at the target may be represented as an inclination and azimuth of the wellbore [Inc_t, Azi_t]. The steering decision system may determine control inputs to drill the wellbore trajectory to the target 206 based on the performance objective and constraint. A path 204 indicates the wellbore trajectory that would be drilled from the starting point 202 to the target 206 based on the control inputs determined by the steering decision system. In some examples, the constraint is that the wellbore trajectory at the target is [Inc_t, Azi_t] and performance objective that is a vertical position deviation between the wellbore trajectory and Zt or TVD is minimized.

Figure 3:
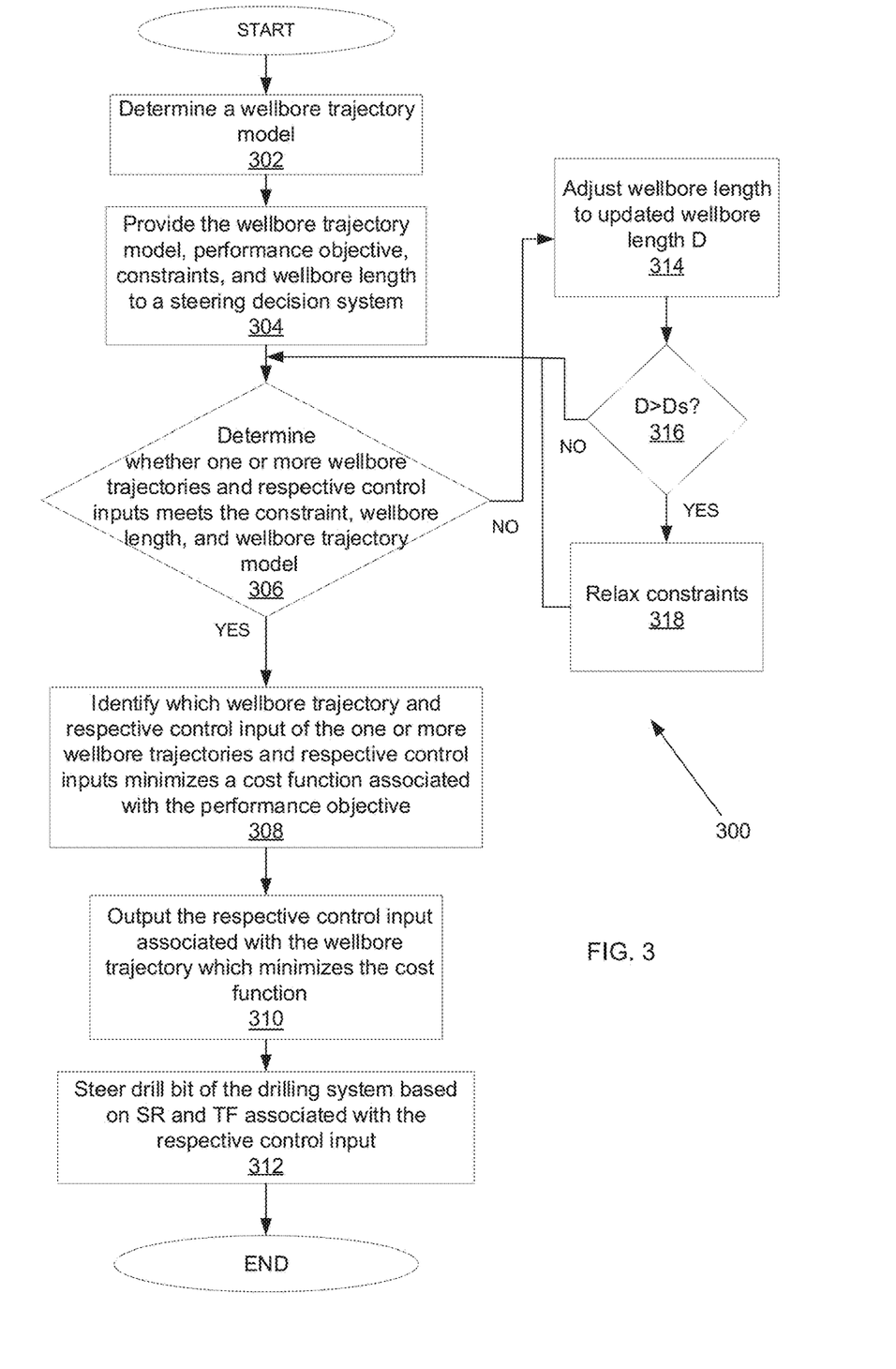
FIG. 3 is an example flow chart of functions associated with determining the control inputs.

FIG. 3 is an example flow chart of functions 300 associated with determining control inputs for drilling a wellbore trajectory in the geologic formation that meet the one or more of the steering decision inputs provided to the steering decision system. The functions 300 may be performed by the steering decision system in software, hardware, or a combination of hardware and software.

At 302, a wellbore trajectory model is determined. The wellbore trajectory model may facilitate predicting a wellbore trajectory. The prediction may be based on one or more of a BHA configuration, surveys, and real-time drilling data. The wellbore trajectory model that is determined may take as input a current state of the wellbore trajectory and a control input and output a future state of the wellbore trajectory which would be drilled based on the inputs. The state may be, for example, one or more of the position, attitude and curvature at a position along the wellbore trajectory.

At 304, one or more steering decision inputs are provided to the steering decision system. The steering decision inputs may be the wellbore trajectory model, a performance objective, an initial wellbore length, and/or constraints associated with a wellbore trajectory to be drilled.

At 306, a determination is made whether one or more wellbore trajectories and respective control inputs meet the constraints, initial wellbore length, and wellbore trajectory model. A respective control input may be control inputs for drilling an associated wellbore trajectory. If one or more wellbore trajectories and respective control inputs meet the constraints, initial wellbore length, and wellbore trajectory model, then, at 308, a determination is made as to which wellbore trajectory and respective control input of the one or more wellbore trajectories and respective control inputs minimizes a cost function associated with the performance objective. For example, a wellbore trajectory and respective control input meets the constraint, if they are within bounds defined by the constraint. For example, a wellbore trajectory and respective control input meets the initial wellbore length, if the wellbore trajectory has a length equal to the initial wellbore length. For example, a wellbore trajectory and respective control input meets the wellbore trajectory model, if the wellbore trajectory model outputs each of the states associated with the wellbore trajectory and respective control input. At 310, the steering decision system outputs the respective control input associated with the wellbore trajectory which minimizes the cost function. The drilling tool at 312, steers the drill bit based on SR and IT associated with the respective control input to drill the wellbore trajectory. Additionally, the steering decision system may cause this wellbore trajectory to be displayed on the display.

The determinations at 306 and 308, which are illustrated as separate operations but can be performed simultaneously, may be mathematically represented as follows:

$$\min_{x,u} J(x(\xi), u(\xi))$$

subject to
$\dot{x}(\xi)=f_s(x(\xi),u(\xi))$
$g_i(x(\xi)) \leq c_i, i=1, \ldots, n$
$h_j(u(\xi)) \leq d_j, j=1, \ldots, m$
$p_k(x(\xi))=e_k, k=1, \ldots, m$
$\xi \in [MD_{start}, MD_{final}]$
where,
$\xi$ represents a measured depth (MD). It takes values between MDstart, which is the current length of the wellbore that has been drilled, and MDfinal which is the final length of the wellbore to be drilled. MDfinal-MDstart specifies a wellbore length that needs to be drilled to reach the target, which is an input to the steering system as the initial wellbore length.

u is a control input associated with steering the drill bit and may be used to determine toolface and steering ratio associated with drilling the wellbore trajectory. The control input may be a plurality of control inputs to drill the wellbore trajectory. In some cases, the control input may be vector.

x is a state of the wellbore trajectory. The state may be indicated by one or more of an attitude (i.e., inclination and azimuth), curvature and/or position of the wellbore trajectory which evolves with MID (or time) of the wellbore trajectory. So, $x(\xi)$ corresponds to the state of the wellbore trajectory at depth $\xi$. The equation with xdot is the most general form of state dynamics which describes how states change with and a control input. For example at depth if the current state is $x(\xi)$ and the control input to the drilling system is $u(\xi)$, the xdot equation indicates a change in the state of the wellbore trajectory at a future depth resulting from the drilling based on the control inputs. In this regard, the wellbore trajectory may be defined by one or more states and x may be vector of these one or more states.

fs represents the wellbore trajectory model of the system, which is used to predict a change in state of the wellbore trajectory based on an earlier state of the wellbore trajectory and a control input. The wellbore trajectory modeling system determines this wellbore trajectory model based on modeling inputs.

gi is a function of state, the inequality represents the state inequality constraints. These constraints can be used to put upper and lower bounds on, for example, the attitude, curvature, tortuosity, and/or position of the wellbore trajectory.

hj is a function of control input, the inequality represents control input constraints. These constraints can be used to bound the control inputs.

pk is a function of state, the equality represents the state equality constraints. These constraints can be used to specify state values at a certain depth such as intermediate points, surfaces, volumes that the wellbore trajectory is to pass through.

J is a cost function which is minimized to meet the performance objective. Since the input u has direct effect on state x, the minimization tries to find best x and u combination to meet the performance objective. A bisection method or any, minimum/root-finding algorithm, a gradient-based method, and/or an interior point method, among others, can be used as the search algorithm for solving the cost function. The x and u combination indicate the control inputs, u, to drill a wellbore trajectory defined by the states, x.

The cost function described above is a generic cost function which is minimized to meet a generic performance objective. A specific performance objective may be to minimize an offset between a wellbore trajectory and a target in the geologic formation which is achieved by a specific cost function. To illustrate the specific cost function, consider that the wellbore trajectory model outputs a state comprising attitude and curvature, e.g., $$x = \begin{bmatrix} \theta \\ \kappa_\theta \\ \phi \\ \kappa_\phi \end{bmatrix} \begin{matrix} \to \text{Inclination} \\ \to \text{Inclination curvature} \\ \to \text{Azimuth} \\ \to \text{Azimuth curvature} \end{matrix}$$

A plane associated with the azimuth is typically perpendicular to a plane associated with the inclination. Because they are perpendicular, the inclination and azimuth are decoupled. In some instances, the planes may not be perpendicular to each other, resulting in coupling between the inclination and azimuth. A pseudo-azimuth is defined which decouples the inclination and azimuth even when the planes are not perpendicular to each other. Pseudo-azimuth is the projection of azimuth onto a plane, which is perpendicular to inclination plane so that the pseudo-azimuth and inclination are decoupled. The inclination and pseudo-azimuth definitions allow for representing the control inputs to the drilling system as control inputs $u\theta$ and $u\psi$ corresponding to applied forces each of a given magnitude at a respective inclination and pseudo-azimuth. These control inputs are used to calculate the SR and TF to steer the drill bit.

$$SR = |u| = \sqrt{u_\theta^2 + u_\psi^2}$$

$$u = \begin{bmatrix} u_\theta \\ u_\phi \end{bmatrix}$$

$$TF = \arctan(u_\phi / u_\theta)$$

$$\psi = \phi \sin(\theta)$$

The control inputs are determined by solving the optimization problem. The optimization problem can be written as follows:

$$\min_{x,u} J_d(x)$$

$$\text{s.t.} \quad x_{k+1} = A_d x_k + B_d u_k + G_d \sin(\theta_0) + D_d \quad (1)$$

$$lb \le x_k \le u_b, \quad (2)$$

$$\sqrt{u_{\theta,k}^2 + u_{\psi,k}^2} \le 1 \quad (3)$$

$$x_n = x_T \quad (4)$$

$$k = 1, \ldots, n$$

$$J_d(x) = \sum_{k=1}^{N} d_{sk}^2 = \sum_{k=1}^{N} (d_0 + \mathcal{T} D_k (\theta - \theta_r))^2,$$

$$D_k = [\ 1^{1 \times k} \quad 0^{1 \times (N-k)}\ ]$$

where,

Jd is a cost function indicative of a vertical position offset of a wellbore trajectory to a target. The wellbore trajectory which minimizes this cost function optimizes the steering. The cost function is written in terms of inclination θ since the state for a vertical plane is inclination, a reference inclination θr, τ, and an initial vertical position offset, do, from the target. In this example, do is indicative of an initial true vertical depth (TVD) offset to the target. Inclination θr represents an inclination associated with the target. In some examples, the inclination θr is specified by a well plan which indicates positions that the wellbore trajectory is to cross. k represents the discretization step, where each step indicates a certain MD along the wellbore trajectory to be drilled from the starting point of the wellbore and k=N indicates an MD equal initially to the initial wellbore length. To illustrate, k=1 may represent a MD 20 feet away from a starting point of the wellbore, k=2 may represent a MD 40 feet away from a starting point of the wellbore, and k=N may represent a MD N*20 feet away from the starting point of the wellbore, where the MD of N*20 feet equals the initial wellbore length provided as input to the steering decision system. The value represents the increment, which this example is 20 feet, Dk is a vector of 1s and 0s which is a function of k. The difference θ-θr is a small angle approximation of the trigonometric function "sin" which when multiplied by τ indicates an TVD offset to the target at the position associated with θ. θ-θr may take the form of a vector of the inclination offsets to the target for each k. In some examples, θr may vary over k. The TVD offsets are summed up to a given k by the product of Dk and θ-θr. The inclinations θ and control inputs which satisfy equations (1) to (4) and minimize the cost function is found. A quadratic convergence is shown by the squaring in equation Jd(x) but an absolute value convergence or some other convergence may also be used.

Equation (1) is a wellbore trajectory model as a function of the state and the control input, where Ad is the system matrix, Bd is the control matrix, Gd and Dd are bias matrices based on gravity and other external effects, respectively. The matrices can be obtained as a result of a modeling process which uses data such as the BHA configuration and real-time data, to describe the wellbore evolution. The system dynamics predict a wellbore trajectory. The wellbore trajectory model predicts a next state $x_{k+1}$ of the wellbore trajectory at a depth k+1 based on an earlier state $x_k$ of the wellbore trajectory at a depth k. Each of these states collectively defines the wellbore trajectory.

Equation (2) is the state constraints, such as bounds for curvature and bounds for attitude along the trajectory between lower and upper bounds.

Equation (3) is a constraint associated with the control input such as the steering ratio being is between 0 and 1.

Equation (4) ensures that a state at k=N corresponds to a state associated with the target as a result of the wellbore trajectory having a length corresponding to the initial wellbore length. Drilling of the wellbore trajectory is feasible if a state of the wellbore trajectory at the target matches xt with the wellbore trajectory having the length corresponding to the initial wellbore length.

Other variations of the performance objective are also possible. For example, a constrained optimization problem may be formulated as a free final measured depth control problem where a final MD to the target is minimized. As another example, the constrained optimization problem can be formulated as a free final time problem where a time to drill and/or final MD is minimized and related via rate of penetration (ROP) which can be selected as an optimization parameter to maximize. In yet another example, the constrained optimization problem can be formulated as a fixed final time problem where the time to drill and/or final MD are related via rate of penetration (ROP) which can be selected as an optimization parameter to maximize. The cost function can be set such that the target is reached with minimum change in control inputs over the wellbore trajectory to minimizes the time and/or final Ml). In some examples, one or more of the MD to the target and/or time may be fixed as a constraint.

If one or more wellbore trajectories and respective control inputs do not meet the constraints, initial wellbore length, and wellbore trajectory model, then at 314, the steering decision system may adjust the wellbore length to reach the target. The wellbore length may be initially set as the initial wellbore length depth provided as the input to the steering decision system and increased by a fixed or variable amount to determine an updated wellbore length D. A determination is made whether the updated wellbore length is greater than a threshold Ds at 316. The Ds may represent a longest wellbore that would be drilled. If the updated wellbore length is less than the threshold Ds, processing returns to 306 where a determination is made whether one or more wellbore trajectories and respective control inputs meet the constraints, the updated measured depth, and wellbore trajectory model. If the updated wellbore length is greater than the threshold. Ds, the steering decision system 104 may further relax the constraints at 318. For example, ranges of curvature or attitude of the wellbore trajectory may be expanded so that the wellbore trajectory can take additional types of curvatures or attitudes. Then processing returns to 306 where a determination is made whether one or more wellbore trajectories and respective control inputs meet the relaxed constraints, the updated measured depth, and wellbore trajectory model. The process of updating the wellbore length and/or relaxing the constraints may continue until a wellbore trajectory is determined at 308 that meets the specified constraints, wellbore length, wellbore trajectory model, and performance objective.

Figure 4A:
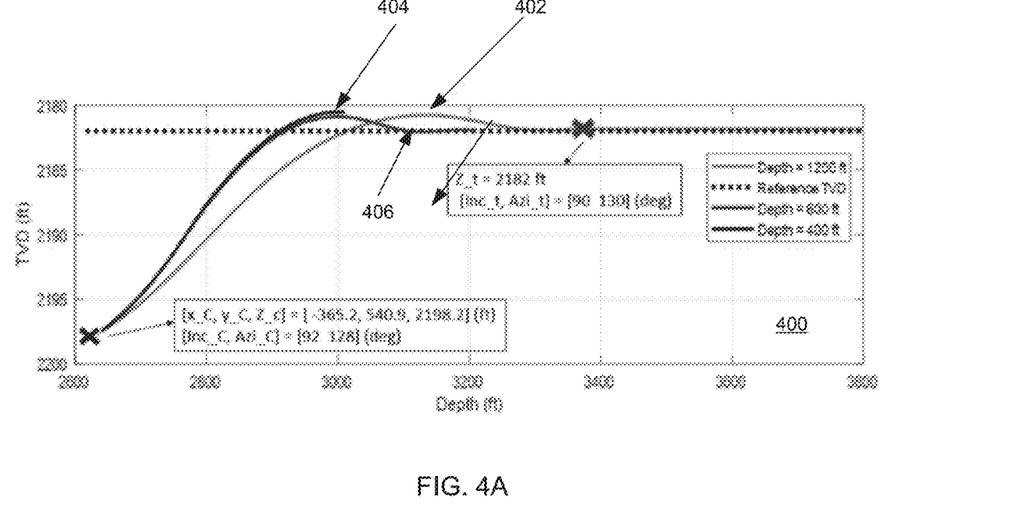
FIGS. 4A, 4B, 4C show various examples of wellbore trajectory data resulting from determining the control inputs.
Figure 4B:
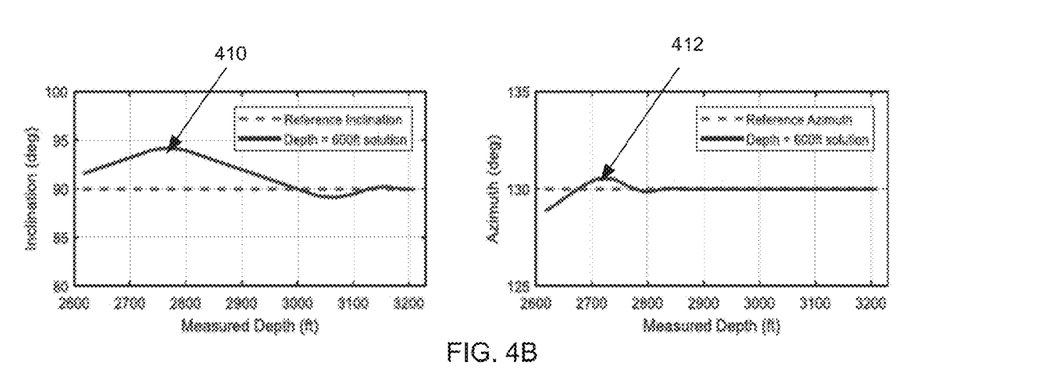
Figure 4C:
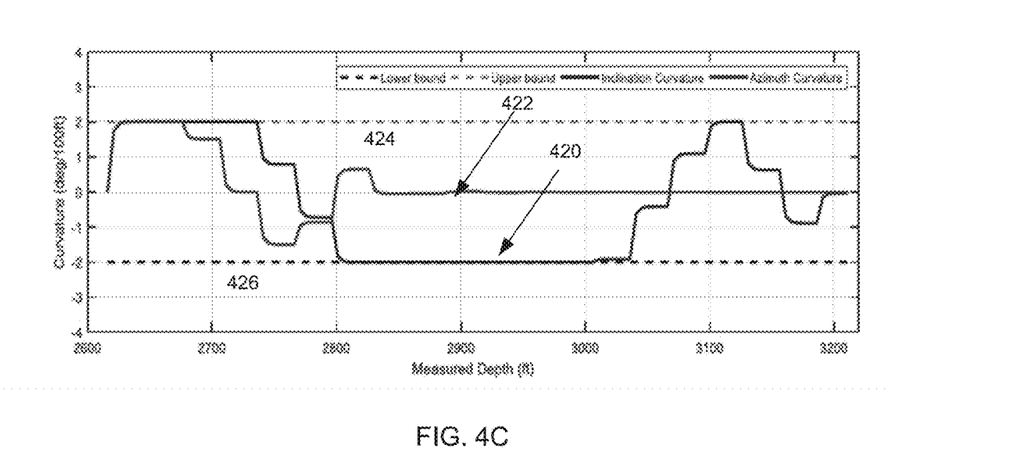

FIG. 4A to C show various wellbore trajectory resulting from minimization of Jd(x) described above. The steering decision system is used to determine a control input which minimizes a vertical position deviation to the target with a constraint of the wellbore trajectory, meeting a target attitude.

FIG. 4A shows sample trajectory results 400 for various Ml) values to reach the target. The sample trajectory results 400 are shown as a function of MD on a horizontal axis and TVD on a vertical axis. A minimum curvature method 402, previously used for determining a wellbore trajectory, indicates that the vertical position offset to the target is minimized with a wellbore trajectory having an MD of 1200 feet. The MD of 1200 feet is improved on by the steering decision system disclosed herein. The wellbore trajectory is determined based on the cost function Id(x) and equations (1) to (4). The wellbore trajectory 404 resulting from the wellbore length set to 400 feet results in the trajectory not meeting the target attitude. For example, the constraint xt of equation 4 is not met. The wellbore trajectory 406 resulting from the wellbore length set to 600 feet meets the target attitude and minimizes the vertical position offset to the target.

FIG. 4B shows the inclination 410 and azimuth 412 meet the constraint xt (i.e., reference angle and reference azimuth shown as the dotted lines) for the MD=600 trajectory. The inclination and azimuth on the vertical axis are shown as a function of measured depth on the horizontal axis.

FIG. 4C shows the azimuth curvature 420 and inclination curvature 422 of the MD=600 trajectory is within upper bounds 424 and lower bounds 426 defined by constraint. The curvature is shown on the vertical axis as function of measured depth on the horizontal axis.

The optimal solution in this example is achieved where the Ml) required is nearly half of the minimum curvature trajectory result while meeting the performance objectives and satisfying the constraints. Further, the constraints may reduce wellbore tortuosity, enabling drilling longer laterals.

Figure 5:
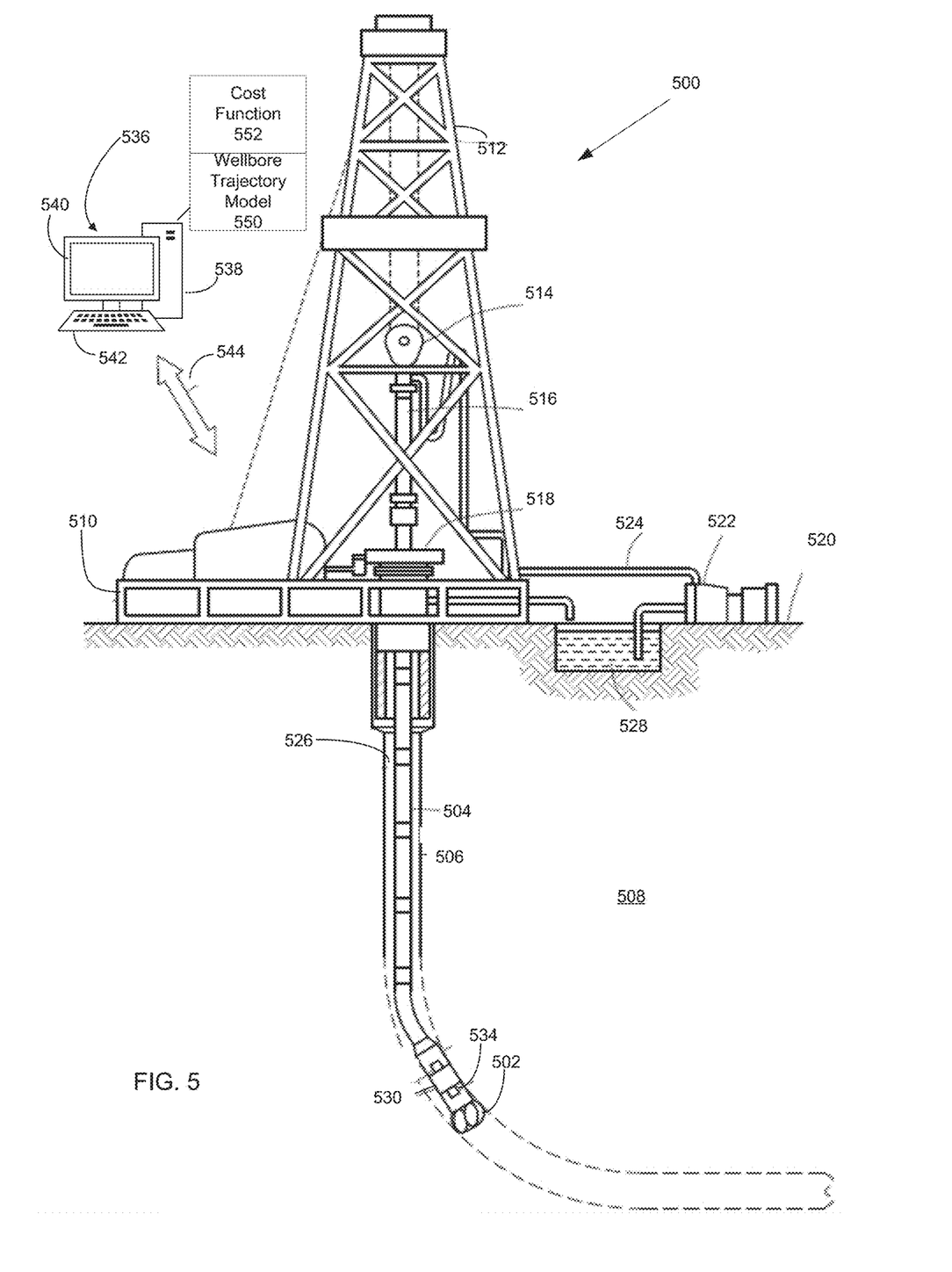
FIG. 5 is a schematic diagram of an example well system for drilling the wellbore trajectory based on the control inputs.

FIG. 5 is a schematic diagram of well system 500 for drilling a wellbore trajectory. The well system 500 includes a drill bit 502 disposed on a drill string 504 of the well system 500 for drilling a wellbore 506 in a subsurface formation 508. While wellbore 506 is shown extending generally vertically into the subsurface formation 508, the principles described herein are also applicable to wellbores that extend at an angle through the subsurface formation 508, such as horizontal and slanted wellbores. For example, the wellbore can be angled vertically followed by a low inclination angle, high inclination angle or horizontal placement of the well. It should further be noted that a land-based operation is depicted, but those skilled in the art will readily recognize that the principles described herein are equally applicable to subsea operations that employ floating or sea-based platforms and rigs, without departing from the scope of the disclosure.

The well system 500 may further includes a drilling platform 510 that supports a derrick 512 having a traveling block 514 for raising and lowering drill string 504. Drill string 504 may include, but is not limited to, drill pipe and coiled tubing, as generally known to those skilled in the art. A kelly 516 may support drill string 504 as it may be lowered through a rotary table 518. The drill bit 502 may crush or cut rock, be attached to the distal end of drill string 504 and be driven either be a downhole motor and/or via rotation of drill string 504 from the surface 520. Without limitation, drill bit 502 may include, roller cone bits, PDC bits, natural diamond bits, any hole openers, reamers, coring bits, and the like. As drill bit 502 rotates, it may create and extend wellbore 506 that penetrates various subterranean formations. A pump 522 may circulate drilling fluid through a feed pipe 524 to kelly 516, downhole through interior of drill string 504, through orifices in drill bit 502, back to surface 520 via an annulus 526 surrounding drill string 504, and into a retention pit 528.

Drill bit 502 may be just one piece of the drill string 504 that may include one or more drill collars 530 and one or a plurality of logging tools 534 such as logging-while-drilling (LWD) or measuring-while-drilling (MWD) tools for measuring, processing, and storing information such as the surveys and continuous measurements used to determine the depth to drill. It will also be understood that more than one logging tool 534 (i.e., one or more MD and/or MWD module) can be employed. Logging tool 534 may be arranged to communicate with a computing system 536. Computing system 536 may include a processing unit 538, a monitor 540, an input device 542 (e.g., keyboard, mouse, etc.), computer media (e.g., optical disks, magnetic disks), a wellbore trajectory model 550, and a cost function 552. The computing system 536 can store code representative of steering decision system described herein for determining a wellbore trajectory and control inputs to drill the wellbore trajectory in the geologic formation that meets one or more of performance objectives and satisfy the constraints, the wellbore length, and the wellbore trajectory model 550. The computing system 536 may be located at the surface, downhole, or partially at the surface and partially downhole. Computing system 536 may act as a data acquisition system and possibly a data processing system that analyzes information from logging tool 534. Any suitable technique may be used for transmitting signals from logging tool 534 to the computing system 536 residing on the surface 520. As illustrated, a communication link 544 (which may be wired or wireless, for example) may be provided to transmit data from logging tool 534 to the computing system 536. Communication link 544 may implement one or more of various known drilling telemetry techniques such as mud-pulse, acoustic, electromagnetic, etc.

Figure 6:
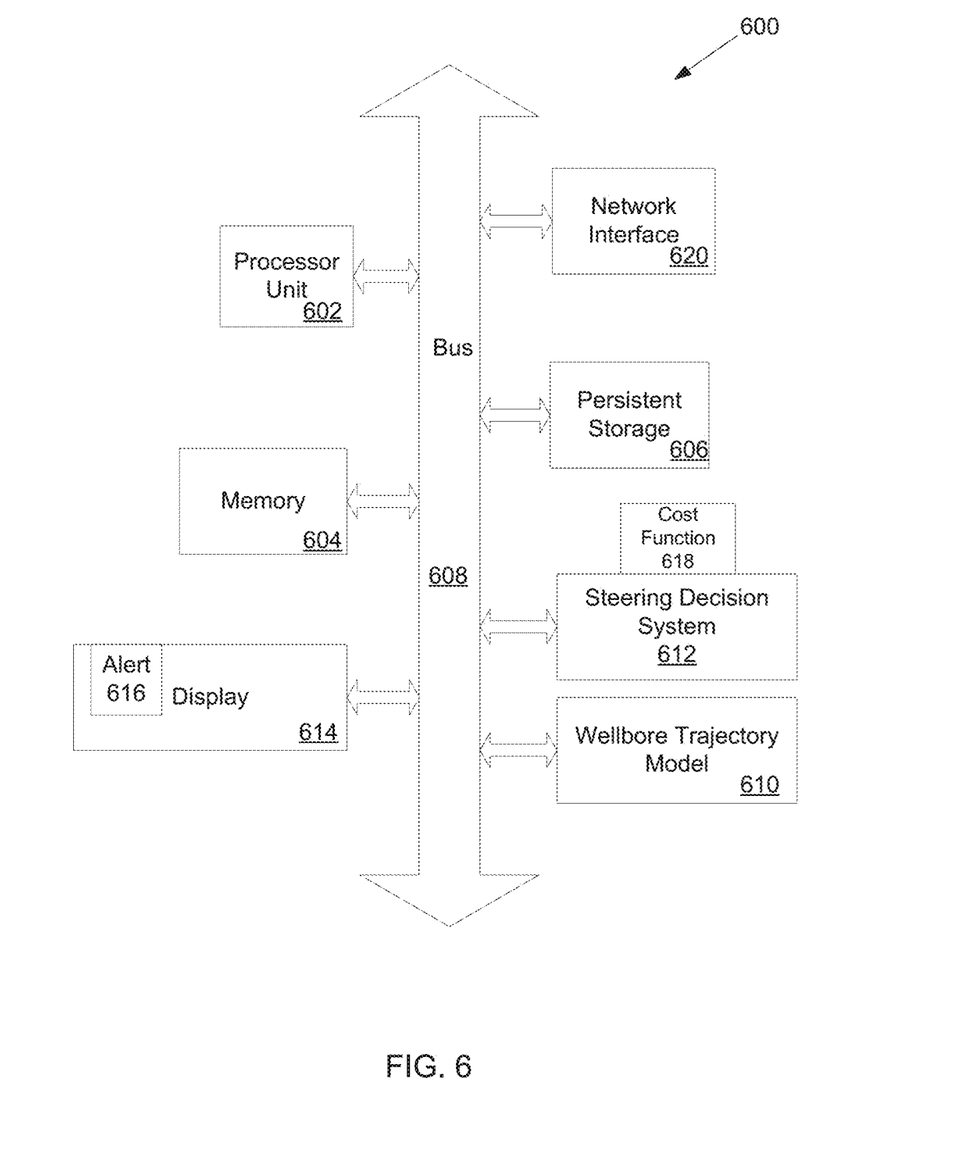
FIG. 6 is a block diagram of example apparatus for determining the control inputs.

FIG. 6 is a block diagram of apparatus 600 (e.g., steering decision system 104) for determining the control inputs to drill a wellbore trajectory in the geological formation. The apparatus 600 may be located at a surface of a geologic formation or downhole. In the case that the apparatus 600 is downhole, the apparatus 600 may be rugged, unobtrusive, can withstand the temperatures and pressures in situ at the wellbore.

The apparatus 600 includes a processor 602 (possibly including multiple processors, multiple cores, multiple nodes, and/or implementing multi-threading, etc.). The apparatus 600 includes memory 604. The memory 604 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The apparatus 600 may also include a persistent data storage 606. The persistent data storage 606 can be a hard disk drive, such as magnetic storage device. The apparatus 600 also includes a bus 608 (e.g., PCI, ISA, PCI-Express, NuBus, etc.). Coupled to the bus 608 is a network interface 620 which facilitates communication with the drilling system to provide the control inputs for steering the drill bit. The persistent data storage 606 may allow for storing states associated with a wellbore trajectory and respective control inputs. The apparatus 600 may have a wellbore trajectory model 610 which determines a future state of a wellbore trajectory based on an earlier state of the wellbore trajectory and a control input. The apparatus 600 also have a steering decision system 612 for determining a wellbore trajectory and respective control inputs which meet a performance objective, constraints, wellbore length, and the wellbore trajectory model 610. The performance objective may be defined by the cost function 618.

Further, the apparatus 600 may comprise a display 614. The display 614 may comprise a computer screen or other visual device. The display 614 may indicate feasibility of drilling the wellbore trajectory. For example, the display 614 displays the wellbore trajectory and constraints used to generate the wellbore trajectory. In the case that the apparatus 600 is located downhole, the display 614 may not be coupled to the bus 608, and instead the network interface 620 may be used to provide the feasibility information to the display located on the surface. Additionally, the display 614 may convey alerts 616. For example, the alerts may indicate that drilling of a wellbore trajectory based on the constraints, wellbore length, performance objective, and wellbore trajectory model is not feasible. The alerts 616 may be visual in nature but they may also comprise audible alerts output by an audio output device (e.g., speaker).

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated; aspects of the disclosure may be embodied as a system; method or program code/instructions stored in one or more machine-readable media. Accordingly, aspects may take the form of hardware, software (including firmware, resident software, micro-code; etc.), or a combination of software and hardware aspects that may all generally be referred to herein as a "circuit," "module" or "system." The functionality presented as individual modules/units in the example illustrations can be organized differently in accordance with any, one of platform (operating system and/or hardware), application ecosystem, interfaces; programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system; apparatus; or device, that employs any one of or combination of electronic, magnetic; optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language; C++ or the like; a dynamic programming language such as Python; a scripting language such as Perl programming language or PowerShell script language; and conventional procedural programming languages, such as the "C" programming language or similar programming languages. The program code may execute entirely on a stand-alone machine; may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for steering a downhole drilling tool to reach a set target in a geological formation to facilitate extraction of the hydrocarbon as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

Example Embodiments

Example embodiments include the following:

Embodiment 1 is a method, the method comprising: receiving a performance objective for drilling a wellbore in a geologic formation, a wellbore trajectory model, an indication of wellbore length, and a constraint associated with drilling the wellbore; determining whether one or more first wellbore trajectories and respective control inputs meets the wellbore trajectory model, the constraint, and the wellbore length; if the one or more first wellbore trajectories and respective control inputs meets the wellbore trajectory model, the constraint, and the wellbore length, then identifying which wellbore trajectory and respective control input of the one or more first wellbore trajectories and respective control inputs minimizes a cost function associated with the performance objective; if the one or more first wellbore trajectories and respective control inputs does not meet the wellbore trajectory model, the constraint, and the wellbore length, then adjusting the wellbore length; determining whether one or more second wellbore trajectories and respective control inputs meets the wellbore trajectory model, the constraints, and the adjusted wellbore length; if the one or more second wellbore trajectories and respective control inputs meets the wellbore trajectory model, the constraint, and the adjusted wellbore length, then identifying which wellbore trajectory and respective control input of the one or more second wellbore trajectories and respective control inputs minimizes the cost function associated with the performance objective; and outputting the control input associated with the wellbore trajectory of the one or more first wellbore trajectories or the one or more second wellbore trajectories that minimizes the cost function. Embodiment 1 further comprises if one or more second wellbore trajectories and respective control inputs does not meet the wellbore trajectory model, the constraint, and the adjusted wellbore length, then adjusting the constraint; determining whether one or more third wellbore trajectories and respective control inputs meets the wellbore trajectory model, the adjusted constraint, and the adjusted wellbore length; and if the one or more third wellbore trajectories and respective control inputs meets the wellbore trajectory model, the adjusted constraint, and the adjusted wellbore length, then identifying which wellbore trajectory and respective control input of the one or more third wellbore trajectories and respective control inputs minimizes the cost function associated with the performance objective; and outputting the control input associated with the wellbore trajectory of the one or more third wellbore trajectories that minimizes the cost function. The performance objective as described in any of the preceding embodiments is to minimize a distance between a target in the geologic formation and the wellbore and wherein operations to determine whether one or more first wellbore trajectories and respective control inputs meets the wellbore trajectory model, the constraint, and the wellbore length and to identify which wellbore trajectory and respective control input of the one or more first wellbore trajectories and respective control inputs minimizes the cost function associated with the performance objective are performed simultaneously. The cost function as described in any of the preceding embodiments receives as an input a plurality of states along a given wellbore trajectory and a respective control input for the plurality of states and provides an indication of the distance. The constraint as described in any of the preceding embodiments limits a trajectory of the wellbore and the control inputs to predetermined values. Adjusting the wellbore length as described in any of the preceding embodiments comprises increasing the wellbore length by a predetermined depth. Any of the preceding embodiments further comprise repeatably adjusting the wellbore length by different amounts until the one or more second wellbore trajectories and respective control inputs meets the wellbore trajectory model, the constraint, and the adjusted wellbore length.

Embodiment 2 is a system, the system comprising: a wellbore trajectory modeling system comprising a wellbore trajectory model associated with a drilling system; a device to receive a performance objective for drilling a wellbore in a geologic formation, the wellbore trajectory model, an indication of wellbore length, and a constraint associated with drilling the wellbore; determine whether one or more first wellbore trajectories and respective control inputs meets the wellbore trajectory model, the constraint, and the wellbore length; if the one or more first wellbore trajectories and respective control inputs meets the wellbore trajectory model, the constraint, and the wellbore length, then identify which wellbore trajectory and respective control input of the one or more first wellbore trajectories and respective control inputs minimizes a cost function associated with the performance objective; if the one or more first wellbore trajectories and respective control inputs does not meet the wellbore trajectory model; the constraint, and the wellbore length, then adjust the wellbore length; determine whether one or more second wellbore trajectories and respective control inputs meets the wellbore trajectory model, the constraint, and the adjusted wellbore length; if the one or more second wellbore trajectories and respective control inputs meets the wellbore trajectory model, the constraint, and the adjusted wellbore length, then identify which wellbore trajectory and respective control input of the one or more second wellbore trajectories and respective control inputs minimizes the cost function associated with the performance objective; and output the control inputs associated with the wellbore trajectory of the one or more first wellbore trajectories or the one or more second wellbore trajectories that minimizes the cost function. Embodiment 2 further comprises a device to: adjust the constraint, if one or more second wellbore trajectories and respective control inputs does not meet the wellbore trajectory model, the constraint, and the adjusted wellbore length; determine whether one or more third wellbore trajectories and respective control inputs meets the wellbore trajectory model, the adjusted constraint, and the adjusted wellbore length; and if the one or more third wellbore trajectories and respective control inputs meets the wellbore trajectory model, the adjusted constraint, and the adjusted wellbore length, then identify which wellbore trajectory and respective control input of the one or more third wellbore trajectories and respective control inputs minimizes the cost function associated with the performance objective; and output the control input associated with the wellbore trajectory of the one or more third wellbore trajectories that minimizes the cost function. The performance objective as described in any of the preceding embodiments of Embodiment 2 is to minimize a distance between a target in the geologic formation and the wellbore. The cost function as described in any of the preceding embodiments of Embodiment 2 receives as an input a plurality of states along a given wellbore trajectory and respective control input for the plurality of states and provides an indication of the distance. The constraint as described in any of the preceding embodiments of Embodiment 2 limits a trajectory of the wellbore trajectory and the control inputs to predetermined value. The device to adjust the wellbore length as described in any of the preceding embodiments of Embodiment 2 comprises the device to increase the wellbore length by a predetermined depth. Any of the preceding embodiments of Embodiment 2 further comprises the device to repeatably adjust the wellbore length by different amounts until the one or more second wellbore trajectories and respective control inputs meets the wellbore trajectory model, the constraint, and the adjusted wellbore length.

Embodiment 3 is a non-transitory machine readable media comprising program code executable by a processor to perform the functions of: receiving a performance objective for drilling a wellbore in a geologic formation, a wellbore trajectory model, an indication of wellbore length, and a constraint associated with drilling the wellbore; determining whether one or more first wellbore trajectories and respective control inputs meets the wellbore trajectory model, the constraint, and the wellbore length; if the one or more first wellbore trajectories and respective control inputs meets the wellbore trajectory model, the constraint; and the wellbore length, then identifying which wellbore trajectory and respective control input of the one or more first wellbore trajectories and respective control inputs minimizes a cost function associated with the performance objective; if the one or more first wellbore trajectories and respective control inputs does not meet the wellbore trajectory model; the constraint; and the wellbore length; then adjusting the wellbore length; determining whether one or more second wellbore trajectories and respective control inputs meets the wellbore trajectory model, the constraint, and the adjusted wellbore length; if the one or more second wellbore trajectories and respective control inputs meets the wellbore trajectory model, the constraint, and the adjusted wellbore length, then identifying which wellbore trajectory and respective control input of the one or more second wellbore trajectories and respective control inputs minimizes the cost function associated with the performance objective; and outputting the control inputs associated with the wellbore trajectory of the one or more first wellbore trajectories or the one or more second wellbore trajectories that minimizes the cost function. Embodiment 3 further comprises program code to: adjust the constraint, if one or more second wellbore trajectories and respective control inputs does not meet the wellbore trajectory model, the constraint, and the adjusted wellbore length; determine whether one or more third wellbore trajectories and respective control inputs meets the wellbore trajectory model, the adjusted constraint; and the adjusted wellbore length; and if the one or more third wellbore trajectories and respective control inputs meets the wellbore trajectory model, the adjusted constraint, and the adjusted wellbore length, then identifying which wellbore trajectory and respective control input of the one or more third wellbore trajectories and respective control inputs minimizes the cost function associated with the performance objective; and output the control input associated with the wellbore trajectory of the one or more third wellbore trajectories that minimizes the cost function. The performance objective as described in any of the preceding embodiments of Embodiment 3 is to minimize a distance between a target in the geologic formation and the wellbore. The cost function as described in any of the preceding embodiments of Embodiment 3 receives as an input a plurality of states along a given wellbore trajectory and respective control inputs for the plurality of states and provides an indication of the distance. The adjusting the wellbore length as described in any of the preceding embodiments of Embodiment 3 comprises increasing the wellbore length by a predetermined depth. Any of the preceding embodiments of Embodiment 3 further comprises repeatably adjusting the wellbore length by different amounts until the one or more second wellbore trajectories and respective control inputs meets the wellbore trajectory model, the constraint, and the adjusted wellbore length.

What is claimed is:

1. A method comprising:
   receiving a performance objective for drilling a wellbore in a geologic formation, a wellbore trajectory model, an indication of wellbore length, and a constraint associated with drilling the wellbore;
   determining whether one or more first wellbore trajectories and respective control inputs meets the wellbore trajectory model, the constraint, and the wellbore length;
   if the one or more first wellbore trajectories and respective control inputs meets the wellbore trajectory model, the constraint, and the wellbore length, then identifying which wellbore trajectory and respective control input of the one or more first wellbore trajectories and respective control inputs minimizes a cost function associated with the performance objective;
   if the one or more first wellbore trajectories and respective control inputs does not meet the wellbore trajectory model, the constraint, and the wellbore length, then adjusting the wellbore length;
   determining whether one or more second wellbore trajectories and respective control inputs meets the wellbore trajectory model, the constraint, and the adjusted wellbore length;
   if the one or more second wellbore trajectories and respective control inputs meets the wellbore trajectory model, the constraint, and the adjusted wellbore length, then identifying which wellbore trajectory and respective control input of the one or more second wellbore trajectories and respective control inputs minimizes the cost function associated with the performance objective; and
   outputting the control input associated with the wellbore trajectory of the one or more first wellbore trajectories or the one or more second wellbore trajectories that minimizes the cost function.

2. The method of claim 1, further comprising if one or more second wellbore trajectories and respective control inputs does not meet the wellbore trajectory model, the constraint, and the adjusted wellbore length, then adjusting the constraint;
   determining whether one or more third wellbore trajectories and respective control inputs meets the wellbore trajectory model, the adjusted constraint, and the adjusted wellbore length; and
   if the one or more third wellbore trajectories and respective control inputs meets the wellbore trajectory model, the adjusted constraint, and the adjusted wellbore length, then identifying which wellbore trajectory and respective control input of the one or more third wellbore trajectories and respective control inputs minimizes the cost function associated with the performance objective; and
   outputting the control input associated with the wellbore trajectory of the one or more third wellbore trajectories that minimizes the cost function.

3. The method of claim 1, wherein the performance objective is to minimize a distance between a target in the geologic formation and the wellbore and wherein operations to determine whether one or more first wellbore trajectories and respective control inputs meet the wellbore trajectory model, the constraint, and the wellbore length and to identify which wellbore trajectory and respective control input of the one or more first wellbore trajectories and respective control inputs minimizes the cost function associated with the performance objective are performed simultaneously.

4. The method of claim 3, wherein the cost function receives as an input a plurality of states along a given wellbore trajectory and a respective control input for the plurality of states and provides an indication of the distance.

5. The method of claim 1, wherein the constraint limits a trajectory of the wellbore and the control inputs to predetermined values.

6. The method of claim 1, wherein adjusting the wellbore length comprises increasing the wellbore length by a predetermined depth.

7. The method of claim 1, further comprising repeatably adjusting the wellbore length by different amounts until the one or more second wellbore trajectories and respective control inputs meets the wellbore trajectory model, the constraint, and the adjusted wellbore length.

8. A system comprising:
   a wellbore trajectory modeling system comprising a wellbore trajectory model associated with a drilling system; and
   a device to:
      receive a performance objective for drilling a wellbore in a geologic formation, the wellbore trajectory model, an indication of wellbore length, and a constraint associated with drilling the wellbore;
      determine whether one or more first wellbore trajectories and respective control inputs meets the wellbore trajectory model, the constraint, and the wellbore length;
      if the one or more first wellbore trajectories and respective control inputs meets the wellbore trajectory model, the constraint, and the wellbore length, then identify which wellbore trajectory and respective control input of the one or more first wellbore trajectories and respective control inputs minimizes a cost function associated with the performance objective;

if the one or more first wellbore trajectories and respective control inputs does not meet the wellbore trajectory model, the constraint, and the wellbore length, then adjust the wellbore length;

determine whether one or more second wellbore trajectories and respective control inputs meets the wellbore trajectory model, the constraint, and the adjusted wellbore length;

if the one or more second wellbore trajectories and respective control inputs meets the wellbore trajectory model, the constraint, and the adjusted wellbore length, then identify which wellbore trajectory and respective control input of the one or more second wellbore trajectories and respective control inputs minimizes the cost function associated with the performance objective; and output the control inputs associated with the wellbore trajectory of the one or more first wellbore trajectories or the one or more second wellbore trajectories that minimizes the cost function.

9. The system of claim 8, further comprising the device to:

adjust the constraint, if one or more second wellbore trajectories and respective control inputs does not meet the wellbore trajectory model, the constraint, and the adjusted wellbore length;

determine whether one or more third wellbore trajectories and respective control inputs meets the wellbore trajectory model, the adjusted constraint, and the adjusted wellbore length; and if the one or more third wellbore trajectories and respective control inputs meets the wellbore trajectory model, the adjusted constraint, and the adjusted wellbore length, then identify which wellbore trajectory and respective control input of the one or more third wellbore trajectories and respective control inputs minimizes the cost function associated with the performance objective; and output the control input associated with the wellbore trajectory of the one or more third wellbore trajectories that minimizes the cost function.

10. The system of claim 8, wherein the performance objective is to minimize a distance between a target in the geologic formation and the wellbore.

11. The system of claim 10, wherein the cost function receives as an input a plurality of states along a given wellbore trajectory and respective control input for the plurality of states and provides an indication of the distance.

12. The system of claim 8, wherein the constraint limits a trajectory of the wellbore trajectory and the control inputs to predetermined values.

13. The system of claim 8, wherein the device to adjust the wellbore length comprises program code to increase the wellbore length by a predetermined depth.

14. The system of claim 13, further comprising the device to repeatably adjust the wellbore length by different amounts until the one or more second wellbore trajectories and respective control inputs meets the wellbore trajectory model, the constraint, and the adjusted wellbore length.

15. One or more non-transitory machine-readable media comprising program code executable by a processor to perform the functions of:

receiving a performance objective for drilling a wellbore in a geologic formation; a wellbore trajectory model, an indication of wellbore length, and a constraint associated with drilling the wellbore;

determining whether one or more first wellbore trajectories and respective control inputs meets the wellbore trajectory model, the constraint, and the wellbore length;

if the one or more first wellbore trajectories and respective control inputs meets the wellbore trajectory model, the constraint, and the wellbore length, then identifying which wellbore trajectory and respective control input of the one or more first wellbore trajectories and respective control inputs minimizes a cost function associated with the performance objective;

if the one or more first wellbore trajectories and respective control inputs does not meet the wellbore trajectory model, the constraint, and the wellbore length, then adjusting the wellbore length;

determining whether one or more second wellbore trajectories and respective control inputs meets the wellbore trajectory model, the constraint, and the adjusted wellbore length;

if the one or more second wellbore trajectories and respective control inputs meets the wellbore trajectory model, the constraint, and the adjusted wellbore length; then identifying which wellbore trajectory and respective control input of the one or more second wellbore trajectories and respective control inputs minimizes the cost function associated with the performance objective; and outputting the control inputs associated with the wellbore trajectory of the one or more first wellbore trajectories or the one or more second wellbore trajectories that minimizes the cost function.

16. The one or more non-transitory machine-readable media of claim 15, further comprising program code to:

adjust the constraint, if one or more second wellbore trajectories and respective control inputs does not meet the wellbore trajectory model, the constraint, and the adjusted wellbore length;

determine whether one or more third wellbore trajectories and respective control inputs meets the wellbore trajectory model, the adjusted constraint, and the adjusted wellbore length; and if the one or more third wellbore trajectories and respective control inputs meets the wellbore trajectory model, the adjusted constraint, and the adjusted wellbore length, then identifying which wellbore trajectory and respective control input of the one or more third wellbore trajectories and respective control inputs minimizes the cost function associated with the performance objective; and output the control input associated with the wellbore trajectory of the one or more third wellbore trajectories that minimizes the cost function.

17. The one or more non-transitory machine-readable media of claim 15, wherein the performance objective is to minimize a distance between a target in the geologic formation and the wellbore.

18. The one or more non-transitory machine-readable media of claim 17, wherein the cost function receives as an input a plurality of states along a given wellbore trajectory and respective control inputs for the plurality of states and provides an indication of the distance.

19. The one or more non-transitory machine-readable media of claim 15, wherein adjusting the wellbore length comprises increasing the wellbore length by a predetermined depth.

20. The one or more non-transitory machine-readable media of claim 19, further comprising repeatably adjusting the wellbore length by different amounts until the one or more second wellbore trajectories and respective control inputs meets the wellbore trajectory model, the constraint, and the adjusted wellbore length.

\* \* \* \* \*

UNITED STATES PATENT AND TRADEMARK OFFICE
CERTIFICATE OF CORRECTION

PATENT NO. : 10,883,341 B2
APPLICATION NO. : 16/537092
DATED : January 5, 2021
INVENTOR(S) : Nazli Demirer et al.

Page 1 of 1

It is certified that error appears in the above-identified patent and that said Letters Patent is hereby corrected as shown below:

On the Title Page

Item [72], delete "Julien Christian Valery Marek" and insert --Julien Christian Valery Marck--

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*